(12) United States Patent  (10) Patent No.: US 7,650,557 B2
Totolos, Jr.  (45) Date of Patent: Jan. 19, 2010

(54) MEMORY SCRUBBING OF EXPANDED MEMORY

(75) Inventor: George Totolos, Jr., Cranberry Township, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 514 days.

(21) Appl. No.: 11/230,993

(22) Filed: Sep. 19, 2005

(65) Prior Publication Data

US 2007/0079185 A1    Apr. 5, 2007

(51) Int. Cl.
*G11C 29/00* (2006.01)
(52) U.S. Cl. .................. 714/763; 714/718; 714/764
(58) Field of Classification Search .......... 714/763, 714/718, 764, 42, 54
See application file for complete search history.

(56) References Cited

U.S. PATENT DOCUMENTS

| | | | |
|---|---|---|---|
| 5,267,242 A * | 11/1993 | Lavallee et al. ............. 714/7 |
| 6,101,614 A | 8/2000 | Gonzales et al. |
| 6,279,128 B1 * | 8/2001 | Arnold et al. ............ 714/49 |
| 6,349,390 B1 * | 2/2002 | Dell et al. ................ 714/6 |
| 6,587,925 B2 * | 7/2003 | Arimilli et al. ........... 711/122 |
| 6,754,815 B1 * | 6/2004 | Ellison et al. ............ 713/1 |
| 6,832,340 B2 * | 12/2004 | Larson et al. ............. 714/42 |
| 7,055,003 B2 * | 5/2006 | Cargnoni et al. .......... 711/135 |
| 7,412,574 B2 * | 8/2008 | Jeddeloh ................. 711/158 |
| 2001/0029592 A1 | 10/2001 | Walker et al. |

OTHER PUBLICATIONS

Simon Tam, Single Error Correction and Double Error Correction, XILINX, Sep. 1, 2004, pp. 1-12, (v2.0), Xilinx, Inc., USA.

* cited by examiner

*Primary Examiner*—Scott T Baderman
*Assistant Examiner*—Fritz Alphonse
(74) *Attorney, Agent, or Firm*—Blakely, Sokoloff, Taylor & Zafman LLP (57) ABSTRACT

Embodiments of the invention include a memory device, such as a removable expanded memory card, having a host bus interface that allows a host to access a memory of the device. The memory device also includes memory scrubbing circuitry to read data stored at addresses in the memory and to identify single-bit errors and multiple-bit errors in the data read from the memory.

11 Claims, 4 Drawing Sheets

MEMORY SCRUBBING OF EXPANDED MEMORY

BACKGROUND

1. Field

At least one embodiment of the present invention pertains to identifying and correcting errors in data stored in a memory device having a host bus interface to allow access to the memory device by a host.

2. Background

Electrically operated machines, such as general-purpose and special-purpose computing devices (e.g., "computers"), data storage devices or systems, network servers, file servers, and Internet servers typically include computer processors and other devices (often operating under the control of a processor) that frequently need to store information in, or retrieve information from a computer memory.

For example, data storage device, such as a network server, file server, or Internet server to store data for access by other entities, such as client devices, may include various types of memory. The data storage device may include a "storage memory" having a number of mass storage devices, such as disk drives. The storage memory may be a storage subsystem located locally or remotely from the data storage device. Reading data from the drives and writing data to the drives can be controlled by an operating system and use a random access memory (RAM) type "main memory".

The processors of the data storage device may have direct access to the main memory via an address and data bus connection or interface. As part of the main memory, the data storage device may include a cache memory to store data that is frequently or recently used when reading data from the drives and writing data to the drives.

For example, a data storage device, may be a server or a storage server having a storage memory, a main memory, and a cache memory to store and retrieve data on behalf of one or more client processing systems (clients). The cache memory may be part of the main memory and may be used to provide quick read and write access to data frequently or recently used (e.g., access without reading the data from storage memory). When data in the cache memory is going to be deleted or written over, a "victim cache" memory may be used to continue to store in the main memory (e.g., for access without reading the "victim" data from storage memory) the "victim" data to be deleted or written over. When the victim cache becomes full, data in the victim cache will also need to be deleted or written over. Thus, access to data deleted or written over in the victim cache will again require accessing the copy of that data in storage memory.

Depending on the size of and frequency of access to the storage memory and main memory, a larger maximum data storage size for the victim cache memory may be desired for peak performance. However, due to maximum data storage size for the hardware constrains of the device, it may not be possible to increase the size of the victim cache memory. In addition, when it is possible to increase the maximum data storage size for the victim cache memory, the increased size may result in an increased number of data errors due to the increased data stored therein. Moreover, as the number of errors increase, a single bit error in a portion of data stored in the victim cache memory may become a double bit error prior to that portion of data being read. Although single bit errors may be correctable, double bit errors may be difficult, if not impossible, to correct. Thus, in addition to increasing a data storage size of the victim cache, it may also be desirable to correct single bit errors in portions of data stored in the cache memory before they become double bit errors.

SUMMARY OF THE INVENTION

The present invention includes a memory device, such as a removable expanded memory card, having a host bus interface that allows a host to access a memory of the device. The memory device also includes memory scrubbing circuitry to read data stored at addresses in the memory and to identify single-bit errors and multiple-bit errors in the data read from the memory.

DETAILED DESCRIPTION

In order to provide quick read and write access to an increased amount of data frequently or recently used, without reading the data from storage memory, the size of the cache memory of a data storage device may be increased. For instance, the size of a victim cache to store "victims" evicted from a main or buffer cache may be increased by providing additional victim cache memory on a removable expanded memory device, such as a peripheral component interconnect (PCI) device or card. The removable expanded memory device may be interfaced to a host bus using a host bus interface to allow a host to access the additional victim cache memory. Since the data stored in the additional victim cache memory will experience data errors, that data may be scrubbed to correct the single bit errors in a portion of the data before the single bit errors become double bit errors. For instance, memory scrubbing circuitry coupled to the additional victim cache memory may request reads of data stored in the memory to so that an error correction circuit can identify and correct single bit errors, as well as identify and deal with multiple bit errors in the data. For instance, although a computing device may check data from memory for errors during normal read operations, it may also "scrub" portions of the memory for errors by reading the portions, such as on a periodic basis and/or when those portions are not being written to or read from.

Figure 1:
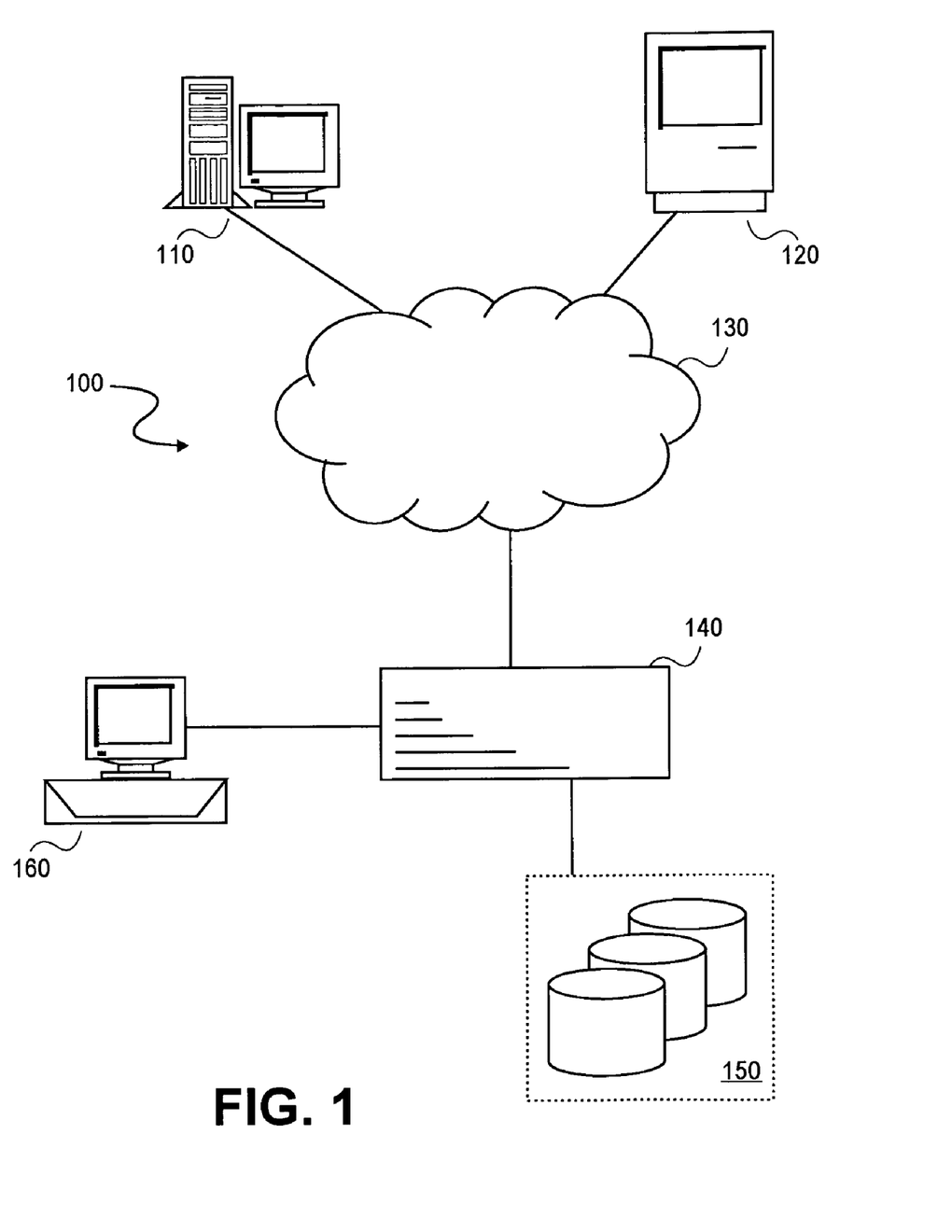
FIG. 1 shows an example of a network environment.

FIG. 1 shows a simple example of a network environment 100, containing computers 110 and 120, which act as clients of server 140. The clients communicate with the server through a medium such as network 130. Computer system 160 may be useful to configure, monitor, or manage server 140. Server 140 may provide data storage services to its clients, such as using disks 150. Disks 150 are considered "storage memory" for server 140. Server 140 may be a "host" or a host device that has a host bus interface coupled to a memory of server 140 to allow a host bus of server 140 (e.g., see bus 240 of FIG. 2) to access peripheral devices such as removable expanded memory devices, peripheral component interconnect (PCI) devices, and/or other removable devices.

Network 130 may be a local area network (LAN), intranet, the Internet, or various other networks over which data is communicated using wired optical, wireless, acoustical, electromagnetic radiation, or other medium as known in the art. Also, computers 110 and 120 may be, for example, a desktop computer, a laptop computer, a hand held computing device, a personal computer (PC), work station, electronic device, computational device, or the like, as known in the art.

Server 140 may represent a data storage device, storage server, network server, file server, where reading data from mass storage devices (e.g., disks 150) and writing data to mass storage devices of the server is controlled by an operating system. An example of such an operating system without limitation thereto, may be Data ONTAP™ by Network Appliance, Inc. of Sunnyvale, Calif. For example, server 140 may have extensive storage resources and services, protected by data redundancy, backup, and power reliability measures. Data storage services may be provided on a per-file basis, where server 140 appears as to its clients as a network file server, or on a per-block basis, where server 140 appears to the clients as a directly-attached disk drive. Blocks of data may consist of, for example, 1,024 (1K) bytes, 4,096 (4K) bytes, or other numbers of bytes of user data. In either situation, server 140 may need to move large quantities of data about, both internally and between its clients and its mass storage devices. For instance, server 140 may read "reads of data" or "data reads" from mass storage devices and/or cache memory to provide the quantities of data. For example, a "read of data" or "data reads" may be a set of bits. Also, a read of data may or data read be a read of one or more blocks or portions of blocks of data read from mass storage devices or cache memory (such as when accessed by a processor and/or according to a look-up request or read request). A read of data or data read may also be a one or more data words, "nibbles" (e.g., 4 bits), or any number of bits (such as when accessed by an error correction code ("ECC") checker and/or an error correction circuit). Each block of data may be uniquely identified by a block identification number, such as a number including a file system identification (FSID) number and a block number.

Specifically, server 140 may control a number of mass storage devices, such as disks 150. Disks 150 may include one or more mass storage devices. Each mass storage device may be, for example, a conventional magnetic disk, an optical disk such as a compact disk-read only memory (CD-ROM), or digital video disk (DVD) based storage, magneto-optical (MO) storage, organic, biological, or any other type of non-volatile storage devices suitable for storing large quantities of data as known in the art. Disks 150 may include a set of mass storage devices which may be organized into one or more volumes of redundant array of inexpensive or independent disks (RAID).

Figure 2:
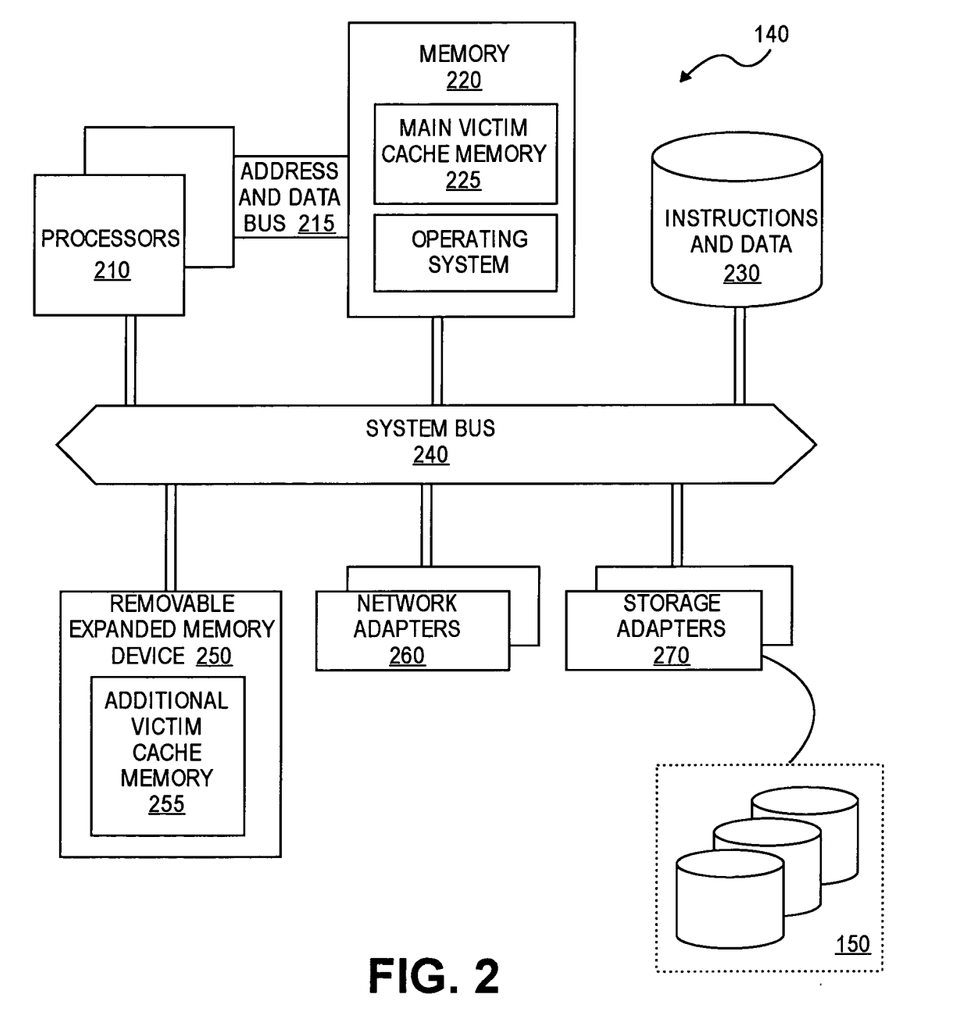
FIG. 2 is a block diagram showing an architecture of a server.

Server 140, may be a server having storage memory (e.g., disks 150), main memory, and cache memory to store and retrieve data on behalf of one or more client processing systems (clients). For instance, FIG. 2 is a block diagram showing an architecture of server 140 and some components thereof, according to certain embodiments of the invention. Certain standard well-known components, which are not germane to the present invention, may not be shown. Server 140 includes one or more processors 210, and memory 220 coupled to system bus 240. Bus 240, shown in FIG. 2, is an abstraction that represents any one or more separated physical buses and/or point-to-point connections, connected by appropriate bridges, adapters and/or controllers. Bus 240, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). In some cases, bus 240, is a host bus, such as a bus to interface a host (e.g., processors 210) to peripheral devices (e.g., disks 150).

Processors 210 may be the central processing units (CPUs) of server 140 and, thus, control and coordinate the overall operation of the server. In certain embodiments, the processors 210 accomplish this by executing software, such as the operating system stored in memory 220. A processor of processors 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 may be or include the "main memory" of server 140. Memory 220 represents any form of random access memory (RAM), read-only memory (ROM), flash memory, or the like, or a combination of such devices. The operating system stored in memory 220 may be the "software" alerted of a single or double-bit error, or receiving an interrupt, as described blow for FIGS. 3-5. Processors 210 have direct access to main memory 220 via an address and data bus 215. Address and data bus 215 may be an address and data bus as know in the art.

As part of or separate from main memory 220, server 140 includes a cache memory to store data that is frequently or recently used when reading data from the drives and writing data to the disks 150. The cache memory may be known as a "block cache" (e.g., because it stores data on a per-block basis) or "buffer cache" and may be a RAM type memory. For example, cache memory may be between 6 and 16 Giga-bytes of disk cache using the motherboard RAM. Memory storage and retrieval functions of the cache memory are typically performed by electronic integrated circuits. The circuits are often packaged in a form known as a dual in-line memory module, or "DIMM." This term will be used herein, but it should be recognized that the discussion applies equally to any memory device having the characteristics described, and not only to memories in the specific DIMM package. For instance, a DIMM may include but is not limited to standard dynamic RAM ("DRAM") devices available today (including synchronous DRAM, "SDRAM;" double data rate, "DDR;" and double data rate version 2, "DDR2" devices).

Disk 230 may contain other instructions and data that are not immediately required by the system in its operations. Network adapters 260 provide the server with the ability to communicate with remote devices, such as the computers 110 and/or 120, over a network (e.g., network 130) and may be, for example, an Ethernet adapter or Fibre Channel adapter (e.g., in a SAN implementation). Storage adapters 270 allow the server to access the storage subsystems, disks 150, and may be, for example, a Fibre Channel adapter or a SCSI adapter. Thus, server 140 can communicate with its clients through network adapters 260, and with its mass storage devices such as disks 150 through storage adapters 270.

According to some embodiments, it is also contemplated that server 140 may represent a computing device, such as a general purpose computing device and/or special purpose computing device, computer 110, a desktop computer, a portable computing device, a handheld computing device, a telephone, a cellular telephone, a gaming device, an internet related computing device, a digital video disk (DVD) player, a set top box, etc., and/or another device or system that may access or include a cache memory to provide quick read and write access to data frequently or recently used.

According to some embodiments, server 140 may also benefit from additional memory, such as to function as additional "main memory", additional "cache memory", "victim cache memory", and/or additional "victim cache memory" of server 140. The additional memory may be memory supplied by one or more expanded memory devices that may be removable. An expanded memory device may be described as a device having a memory and a host bus interface to interface with a host bus, such as of a host system or processor. Moreover, the processors of the host device may not have direct access to the expanded memory device, such as by not having an address and data bus connection or interface to the expanded memory devices. In some cases, as opposed to a device (e.g., main memory) which has an address and data bus interface and a host bus interface, an expanded device may only have a host bus interface.

A removable expanded memory devices may be described as an expanded memory device that can be added and/or removed from host bus. Thus, the term "removable" may connote a device or card that can be connected or "plugged-in" and disconnected or removed from a port, adapter, connector, or an access or interface to a host bus. In some cases, a removable device may be added to or removed from the host bus or peripheral bus without rebooting, initializing, or resetting the host device. Specifically, a removable expanded memory device may be a peripheral device, such as a PCI device, that may be interfaced with and removed from a host bus (e.g., such as a PCI card, including a host bus interface).

For instance, FIG. 2 shows bus 240 interfaced to expanded memory device 250. It is considered that expanded memory device 250 may include or be an expanded memory device, a removable expanded memory device, a memory card, a peripheral component interconnect (PCI) device, a victim cache memory, an expanded victim cache memory, and/or an additional victim cache memory.

Device 250 may be a victim cache memory or an expanded victim cache memory, separate from memory 220, that may be installed on an add-in card, such as a PCI cache memory card. An expanded victim cache memory may be a victim cache memory that is larger than a typical cache or victim cache memory size available or used for the type of device the memory is contained on. For instance, an expanded victim memory device may be a PCI memory card providing 64 Giga-bytes of victim cache memory. Thus, device 250 may provide a victim cache memory that did not previously exist for the device the memory is contained on. Alternatively, device 250 may provide an expanded victim cache memory used instead of and having a size greater than a victim cache memory that would have been used for the device the memory is contained on (e.g., prior to incorporation or use of device 250). For example, device 250 can provide 64 Giga-bytes of expanded victim cache memory used instead of a previous 6-16 Giga-bytes of motherboard RAM previously used as the victim cache (e.g., the 6-16 Giga-bytes of motherboard RAM is now available for use otherwise, such as main memory or cache memory).

Alternatively, expanded memory device 250 may be an additional victim cache memory (e.g., separate from memory 220), that may be installed on an add-in card, such as a PCI memory card. An additional victim cache memory may be a memory device, separate from a "main" victim cache memory. Thus, the victim cache may be described as a main victim cache memory, and the additional victim cache memory may be a separate device having additional memory for use as victim cache memory to store data discarded by the main victim cache memory. Specifically, FIG. 2 shows main victim cache memory 225 as part of memory 220, and additional victim cache memory 255 as part of device 250. Thus, the main victim cache memory may provide a typical 16 Giga-byte motherboard RAM memory as know in the art, while the additional victim cache memory expands that ability with a PCI memory card providing 64 Giga-bytes of additional victim cache memory. As noted above, in cases where there is not a main victim cache memory in memory 220, memory 225 may not exist in FIG. 2, and memory 255 may be described as an expanded victim cache memory, because no victim cache memory exists in memory 220.

Accordingly, device 250 may be used as an expanded victim cache memory to store data or Blocks of victim cache data selected for removal from the cache memory (e.g., a cache that is part of memory 220). Also, device 250 may be used as an additional cache memory to store data or Blocks of victim cache data selected for removal or eviction from the main victim cache. It is considered that device 250 and components thereof may be part of an expanded memory device that functions other than as a main memory, cache memory, or victim cache memory. Data may be stored in the storage memory, main memory, cache memory, victim cache memory, expanded victim cache memory, and/or additional victim cache memory on a per-file and/or on a per-block basis.

In operation, the server may place user data on mass storage devices 150 for long-term availability, but to improve performance and throughput, it may be beneficial to store, or "cache," copies of the user data in memory 220. Eventually, memory 220 may become full of these cached copies of user data, and a least-recently-used ("LRU"), first-in-first-out (FIFO), random, round robin, least-frequently-used ("LFU"), or similar algorithm may be employed to determine which cached data to remove when it is desired to store copies of new data. For instance, in a least-recently-used ("LRU") algorithm, the amount of time that has passed since a block of data was used could be counted, and blocks can be replaced by discarding least-recently-used blocks first. Also, in a least-frequently-used ("LFU") algorithm, the number of times a block of data was used could be counted and blocks can be replaced by discarding least-frequently-used blocks first. A FIFO algorithm could be used to discard the oldest chunk of data (even if it was recently used). Also, a random algorithm could be used to randomly choose a block of data to replace. In some cases, blocks can be tracked according to block identification numbers, and discarded in numerical order, according to block identification numbers, regardless of their access pattern. According to some embodiments, a LRU algorithm tends to offer the best performance without too much complication. Blocks of data selected for removal are called "victims," and would normally be discarded from memory 220 to make room for the new data. (The discarded victim data can, of course, be read in again from mass storage devices 150 if necessary. The memory caching described here only effects system performance, not data integrity.) Improved system performance may be possible if, instead of simply discarding cache victim data blocks, they are copied to a "victim" cache memory. Similar to the memory 220, when the victim cache memory becomes full of the victim cached copies of user data, a LRU or similar algorithm may be employed to determine which victim cached data to remove when it is desired to store copies of new victim data. Blocks of victim cache data selected for removal would normally be discarded from the victim cache to make room for the new data.

Similarly to as noted above, further performance improvement may be possible if, instead of simply discarding the victim cache data to be removed, it is stored in an expanded or additional victim cache memory. More particularly, an expanded or additional victim cache memory provides additional data storage for quick read and write access to data frequently or recently used (e.g., access without reading the data from storage or main memory). Of course, when the expanded or additional victim cache memory becomes full of the victim cached copies of user data, a LRU or similar algorithm may be employed to determine which victim cached data to remove or discarded to make room for the new data. For instance, referring to FIG. 2, server 140 may use expanded memory device 250 as an expanded victim cache memory device or an additional (e.g., internal) victim cache memory of a main victim cache memory. Expanded or additional victim cache memory capability provided by device 250 permits more user data to be stored for ready access. Data in device 250 may be located and copied into memory 220 for further processing by processors 210 much faster than the same data could be located and transferred from mass storage devices 150.

To transfer data to and from device 250, direct memory access ("DMA") operations may be most efficient. In a DMA transfer, a processor or CPU may configure a special-purpose circuit with source and destination addresses and other information, and then the circuit automatically generates addresses and performs consecutive memory cycles to move data from one place to another. Note that the memory access patterns resulting from a DMA transfer are predictable given knowledge of the information with which the special-purpose circuit is configured. It is noted that although the removable expanded memory device may provide victim cache memory, inserting data into, removing data from, looking data up in, and/or accessing data stored in the removable expanded memory device may take more time than similar operations take with respect to the main cache memory. For example, referring to FIG. 2, while processor 210 may access memory 220 by address and data bus 215, such as over a single bridge, processor 210 must access device 250 by bus 240 and host bus 301, such as over two bridges. Thus, accessing a victim cache memory and device 250 may be slightly slower than accessing a cache memory in memory 220. However, in many cases, accessing a victim cache memory in device 250 will be much quicker (e.g., at least twice as quick) than accessing the same data from mass storage devices 150.

In some cases, device 250 is a memory card with high-availability features. It does not have any software to lookup the cache contents or manage the data that comes and goes from it. It is optimized to move data in and out as fast as possible while maximizing data protection and minimizing power consumption. In these cases, there should be no difference in the hardware when reading existing blocks (e.g., lookup) or inserting new ones.

Also, according to some embodiments, there will be no appreciable difference between speeds for insertion, eviction, and lookup of data in a local buffer cache memory. Likewise, according to some embodiments, there will be no appreciable difference between speeds for insertion, eviction, and lookup of data in a remote victim cache memory (e.g., a remote PCI card memory).

For instance, for some PCI card victim cache designs (e.g., a remote victim cache memory), the lookup may be completely done in software from main system memory (e.g., memory 220). In other words, the PCI Card will not be involved in any aspect of the cache lookup so it has no impact on the lookup. However, according to some embodiments, an extension of the PCI card victim cache architecture could be to offload more of the cache processing onto the PCI card hardware and have a processor (e.g., processors 210) request a block identification from the PCI card and have the PCI card look up or request to read that block's cache contents (e.g., circuitry of the PCI card, such as 350 and/or controller 352 of FIG. 3 below, perform these PCI card tasks). In either case, the lookup times should be quick since they only involve reading a few locations in state memory to see if the desired address requested to be read happens to be in the PCI card victim cache. This may be done by hashing and traversing linked lists of cache entries and could take <2% of the time it actually takes to replace a cache entry in the PCI card victim cache.

Also, actual eviction may take no time at all. For instance, a typical cache replacement algorithm will choose to replace a block that is clean (matches the disk). Thus, there is no housekeeping that has to be done to evict the block. The block can be evicted or "disappear" with no effect on data integrity. In other words, the old block can simply be overwritten with the new block. Specifically, in some cases a PCI memory card cache may require the movement of 4 kB blocks of data anytime the computing system (e.g., according to the operating system of system 140) wants to read or replace a disk block of the PCI memory card cache.

Figure 3:
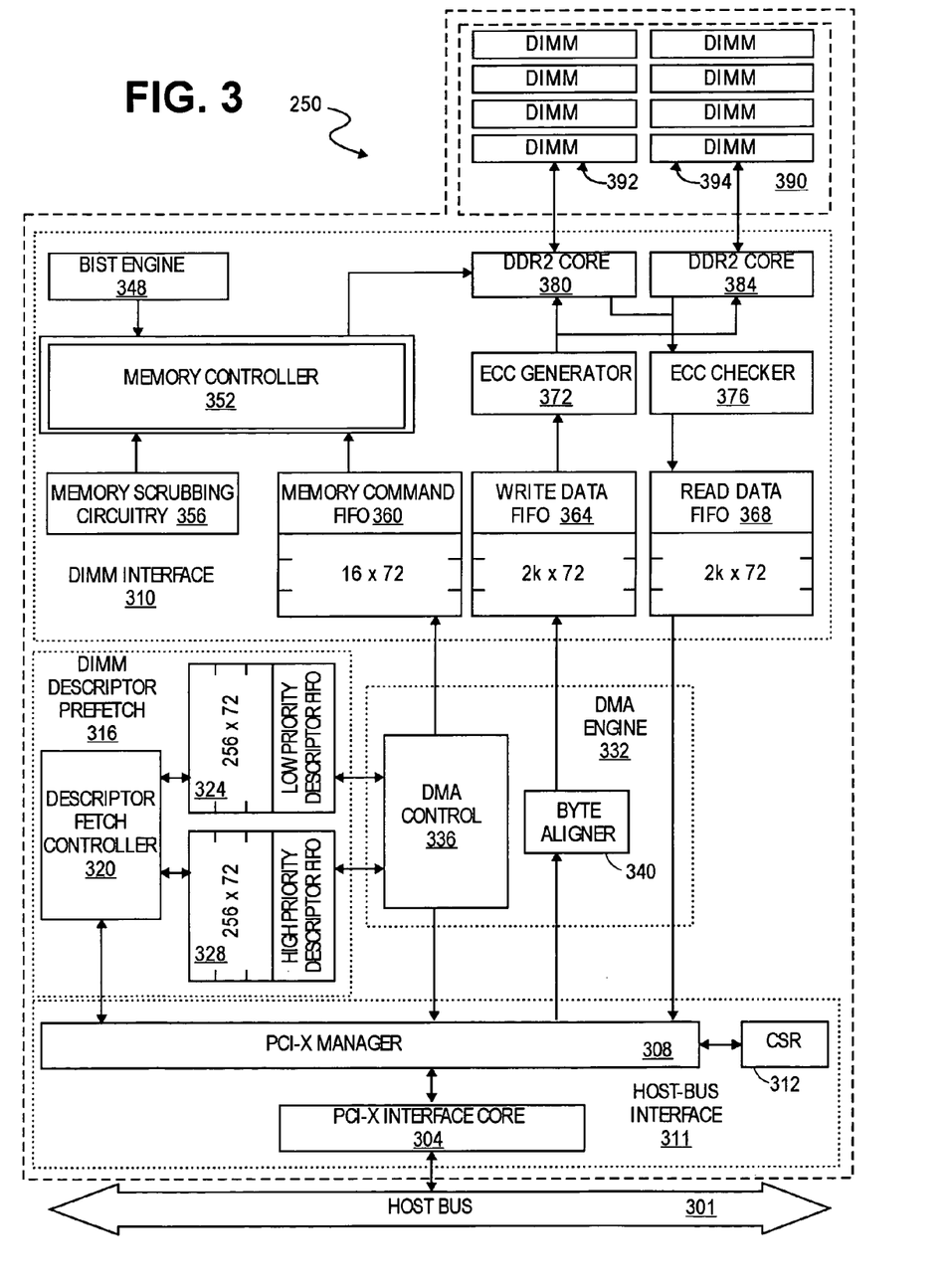
FIG. 3 shows a block diagram of a memory device, in accordance with an embodiment of the invention.

FIG. 3 shows a block diagram of a memory device, in accordance with an embodiment of the invention. FIG. 3 shows a block diagram of the structural components that may be present in an embodiment of expanded memory device 250 of FIG. 2. For instance, in FIG. 3, device 250 is shown including memory 390 connected or interfaced by host bus interface 311 to allow host bus 301 to access memory 390.

Device 250 may be defined as an expanded device or a removable expanded device, such as the device that a processor of the host or a processor coupled to interface 301 does not directly access. For example, the processor in question may directly access a main victim cache, but must access memory 390 using a host bus interface, such as interface 301.

Host bus 301 represents a communication channel that permits the cache controller to transfer data between memory 390 and other components in the system (not shown in this figure). For instance host bus 301 may be part of or all of system bus 240 of FIG. 2. Device 250 also has DIMM interface 310 interfacing host bus interface 311 (such as via DMA engine 332) to memory 390.

Memory 390 is shown including DIMM banks 392 and 394, (e.g., where each of banks 392 and 394 may be described as a "memory bank"). However memory 390 may include more or less than two banks of memory, such as by including 2, 4, 6, 8, 10, 12, 16, 32 or a combination thereof of banks of memory. Also, memory 390 may include various types of memory, such as RAM, dynamic RAM ("DRAM"), standard dynamic RAM ("SDRAM"), double data rate RAM "DDRRAM", and double data rate version 2 RAM, "DDR2RAM". For instance, DIMM banks 392 and 394 may be one or more banks of memory chips, integrated circuits, types of RAM, etc. as known in the art.

The cache control functions of device 250 may be implemented by one or more integrated circuits, programmable gate arrays, logic circuits, or other circuit elements. For instance, device 250, DIMM interface 310 and/or host bus interface 311 may be or include one or more a field-programmable gate arrays (FPGAs), and/or programmable memory controllers that accesses memory 390 based on DMA descriptors received from a host system via host bus interface 311.

Peripheral Component Interface-Extended ("PCI-X") Interface Core 304, PCI-X Manager 308 and Command-Status Register 312 provide electrical and timing control appropriate for interfacing to host bus 301. The DMA Descriptor Prefetch section 316, including descriptor fetch controller 320, low-priority descriptor first-in, first-out ("FIFO") 324 and high-priority descriptor FIFO, receives DMA requests from the system and provides them to DMA engine 332. The DMA engine 332, including DMA control 336 and byte aligner 340, moves data between the host system and DIMM interface 310. The source (or destination) on the host system may be, for example, memory 220 as shown in FIG. 2, or some other device or component that can be accessed through host bus 301.

FIG. 3 shows host bus interface 311 including PCI-X interface core 304, PCI-X Manager 308 and Command-Status Register 312. For example, memory controller 352 may provide appropriate signals to control reading data from and writing data to memory 390 from a data source or target of a DMA request from host bus 301 (e.g., according to an application of a host or other computer coupled to host bus 301). Thus, interface 311 may interface host bus 301 to memory 390, by providing host bus 301 access to DIMM interface 310. In some embodiments, it is also contemplated that PCI-X interface core 304 may be described as the host bus to interface host bus 301 to memory 390.

DIMM interface 310 may include a memory control block. For instance, DIMM interface 310 is shown in FIG. 3, including built-in self test ("BIST") engine 348, memory controller 352, memory scrubbing circuitry 356 (e.g., a memory scrubber), command and data FIFOs 360, 364 and 368, error correction code ("ECC") generator 372 and ECC checker 376, and DDR2 cores 380 and 384, moves data in or out of DIMM banks 392 and 394 of memory 390.

Device 250 includes memory scrubbing circuitry 356 coupled to memory 390 to request a reads of data stored at addresses of memory 390, and to identify or detect errors in the data read. FIG. 3 shows an embodiment where DIMM interface 310 includes memory scrubbing circuitry 356 coupled to memory 390 to request a reads of data stored at addresses of memory 390 (e.g., addresses of DIMM banks 392 and 394), and to identify or detect errors in the data read. Specifically, circuitry 356 may request reads of data stored in memory 390 so that single-bit errors and multiple-bit errors can be identified or detected in the data stored, from the reads of data. A single-bit error may be described as a data word having a single-bit error. Multiple-bit errors may be described as a data word having a more than one single-bit error in the data word, such as a data word having two, three, four, five, etc. single-bit errors. It can be appreciated that the multiple-bit errors may be single-bit errors that are located at adjacent bits or at bits that are separated by one or more non-bit errors. For instance a multiple-bit error may develop from a single-bit error in the data word, when another single-bit error develops, thus causing a multiple-bit error (e.g., double-bit error).

Thus, it is desirable for circuitry 356 to request reads of data stored in memory 390 or scrub memory 390 for single-bit errors, before those single-bit errors can accumulate into double-bit errors. In other words, one single-bit error in a data word may be a single-bit error that can be corrected by a correction algorithm. However, if another single-bit error develops in the data word, the data word now has a double-bit error, which may not be correctable. Thus, it is desirable to scrub data words of memory 390 to correct single-bit errors before they become or accumulate into double-bit errors. Moreover, the identified errors can be corrected by circuitry and/or software of device 250, and/or by software external to device 250 (e.g., an operating system of the host coupled to the host bus).

Requesting the reads of data stored, identifying or detecting errors, correcting errors identified, and/or alerting software of errors identified may be defined as "scrubbing errors from memory" or "memory scrubbing." Using the circuitry described above, memory of device 250 (e.g., DIMM bank 390) may be scrubbed for errors by memory scrubbing circuitry 356 requesting reads of data stored in memory 390 from memory controller 352. The reads of data stored may be deposited in read data FIFO 358, from where they are checked by ECC checker 376 against error control codes corresponding to the data stored. For example, checker 376 may include circuitry, and/or logic to implement an algorithm to check the reads of data stored against error control codes transmitted with that data when that data was received by device 250 (e.g., the error control codes may be stored in memory 390, a controller, a FIFO, checker 376, or other memory and be accessible by checker 376 to identify whether errors exist in the reads of data stored (such as by existing in the data stored in memory 390). Thus, if data stored in memory 390 has errors, those errors may be identified by checker 376 as a result of the request to read data stored sent by circuitry 356 to controller 352.

In some cases, the error control codes used by checker 376 may be standard error control codes, and/or single-bit error control codes. Such error correction codes, without limitation thereto, may include those used for Reed-Solomon, Golay, BCH, Chipkill, Hamming, "parity", and codes used for other error correction techniques. For instance, when data is inserted or written to memory 390, generator 372 may keep or generate one, two, or more bits of data for each byte stored in memory 390 as an error correction code (ECC) for that byte. Keeping or generating the code may be according to an algorithm implemented in generator 372 by hardware, software, logic, processors, etc. The error correction code from generator 372 may be stored in memory 390, such as by being stored in memory 390 with the bytes of data corresponding to the code. For instance one or more ECC bits may be appended to one end of the data byte they correspond to, and the appended byte may then be stored in memory 390 (such as adjacent to another such appended byte). Then, when data is read from memory 390, each byte of the read data may be compared with the error correction code stored in memory 390, to ensure that there are no errors in the bits of the byte. The comparison may include checker 376 keeping or generating a check code for each byte using a process similar to that performed by generator 372 to create the error correction code, except for checker 376 performs that similar operation on the bytes read for memory 390 and compares the check code generated from those stored bytes with the previously generated code from generator 372. Thus, checker 372 may generate the check code according to an algorithm implemented in generator 372 by hardware, software, logic, processors, etc. Comparing the check code against the ECC code may be according to an algorithm implemented in checker 372 by hardware, software, logic, processors, etc. Moreover, generator 372 and checker 372 may include additional algorithms, hardware, software, logic, processors, machine executable code, memory, integrated circuits, programmable gate arrays, controllers, buffers, state machines, FPGAs, PLDs, active devices (e.g., transistors, etc.), passive devices (e.g., inductors, capacitors, resistors, etc.), and/or other circuit elements to perform the error checking and/or to correct errors found or identified in the read bytes.

It is contemplated that the error correction code from generator 372 may be stored in memory other than memory 390. Typically, the more bits kept per byte in an ECC code (e.g., stored in memory 390 with the corresponding byte), the more accurate error detection can be and the more error bits that can be corrected for a single data read or byte.

As noted above, identified errors may be corrected, scrubbed, or reported to software. For example, circuitry 356, controller 352, checker 376, and/or interface 310 may include a correction circuit and/or logic to implement a single-bit error correction algorithm to correct a single-bit error identified or detected in reads of stored data, such as an error identified by checker 376. In some cases, the algorithm may correct a single-bit error identified in a data word. In addition, the correction circuitry may write a corrected data word back to memory 390 to replace the erroneous data word (e.g., the word including the single-bit error), and log the error, such as to alert software of the identifying of the error and writing of the corrected data word.

Moreover, the correction circuit may alert software of a multiple-bit error (e.g., such as a double-bit error) identified. The software may or may not be replace the data or data word in memory (e.g., the word including the double-bit error) with corrected or appropriate data, or deal with the double-bit multiple error otherwise. For instance, stronger forms of ECC code (e.g., Chipkill) may be used to correct up to 4 bit errors in a single ECC word, if all of the errors are from the same "nibble" (e.g., within the same 4-bits of data).

It can be appreciated, that timely correction of single bit errors can reduce the number of multiple bit errors that occur. For instance, if a single bit error is corrected in a data word prior to the occurrence of a subsequent single bit error, the subsequent single bit error may also be corrected as a single bit error. Alternatively, if the first single bit error is not corrected, the second single bit error will cause a double bit error. In cases where a multiple-bit error cannot be corrected, a portion of the data in memory 390 (e.g., including the word including the multiple-bit error) can be replaced (e.g., by software or the operating system), as appropriate. Handling a multiple-bit error may include sending an alert to software or an operating system to replace a word including a multiple-bit error, and/or otherwise handling the multiple-bit error appropriately, as described above. Sending an interrupt to the operating system may be a part of performing double-bit, or multiple-bit error handling or correction.

Thus, circuitry 356, and/or controller 352 may include a scheduler to schedule reads of data stored in memory 390 as periodic reads. Moreover, the scheduler may form reads of data where each subsequent read of data begins at an address greater than an address of data read during the prior read (e.g., the reads sequentially increase through addresses of memory 390).

However, it is also desirable for reads of data stored requested by circuitry 356 not to interfere with reading and writing of data to and from memory 390 according to requests received from host bus 301. For instance, it can be appreciated that the DMA request received from interface 301 may be generated by software applications or programs of a host device or other device connected to or accessing interface 301. Thus, the priority function of device 250 may be determined to be allowing access to memory 390 for DMA requests received from interface 301. Thus, circuitry 356 and/or controller 352 may include an arbiter, such as a central arbiter, to arbitrate access to memory 390 between DMA requests from interface 309 and reads of data stored requested by circuitry 356. In some cases, the arbiter may schedule the reads of data store requested by circuitry 356 when memory 390 is not being accessed by a DMA request from interface 301, such as by delaying the reads of data stored until after the access is completed for the DMA request.

In other cases, the arbiter, circuitry 356, and/or controller 352 may include a tracker to track DMA requests and determine which bank of memory 390 (e.g., DIMM bank 392 or 394) the DMA requests is going to access. The tracker, arbiter, circuitry 356, and/or controller 352 may then append the requested data read from circuitry 356 to the DMA request from interface 301. More particularly, the tracker may track requests to access memory 390 received from interface 301, such as to allow a read request from circuitry 356 to be appended, added to, or concatenated onto the request received from interface 301. Using this process allows the read request from circuitry 356 to access a bank of memory that is already to be accessed by the DMA request, such as to be more efficient and/or reduce power consumption by reading a memory bank that is already activated by the DMA request.

In some cases, the arbiter, scheduler, circuitry 356, controller 352, and/or device 250 may include a timer to alert or cause the arbiter, scheduler, circuitry 356, controller 352, checker 376, and/or another portion or circuitry of device 250 to cancel or discontinue a scrubbing operation if the operation is or will take longer than a selected period or number of clock cycles (e.g., clock cycles of device 250, interface 301, and/or a host device). For instance, discontinuing a scrubbing operation may include any or all of: a) causing the arbiter or controller 352 to cancel or discontinue reading data stored in memory 390; and/or b) causing checker 376 to discontinue identification or detection of errors in reads of data stored if the reads and/or identification (and/or correction of errors, and/or writing back, and/or alerting). In other words, if the memory scrubbing operation exceeds a certain length of time, an alert may be sent to discontinue the scrubbing operation.

It is contemplated that circuitry 356, controller 352 and functions thereof may be part of removable expanded memory device that functions other than as a main memory or cache memory. Also, device 250, the correction circuit, the scheduler, the arbiter, the tracker, the timer, and/or circuitry 356 may include various electronic hardware, software, machine executable code, media storing machine executable code, processors, memories, integrated circuits, programmable gate arrays, controllers, buffers, logic circuits, state machines, FPGAs, PLDs, active devices (e.g., transistors, etc.), passive devices (e.g., inductors, capacitors, resistors, etc.), and/or other circuit elements.

Figure 4:
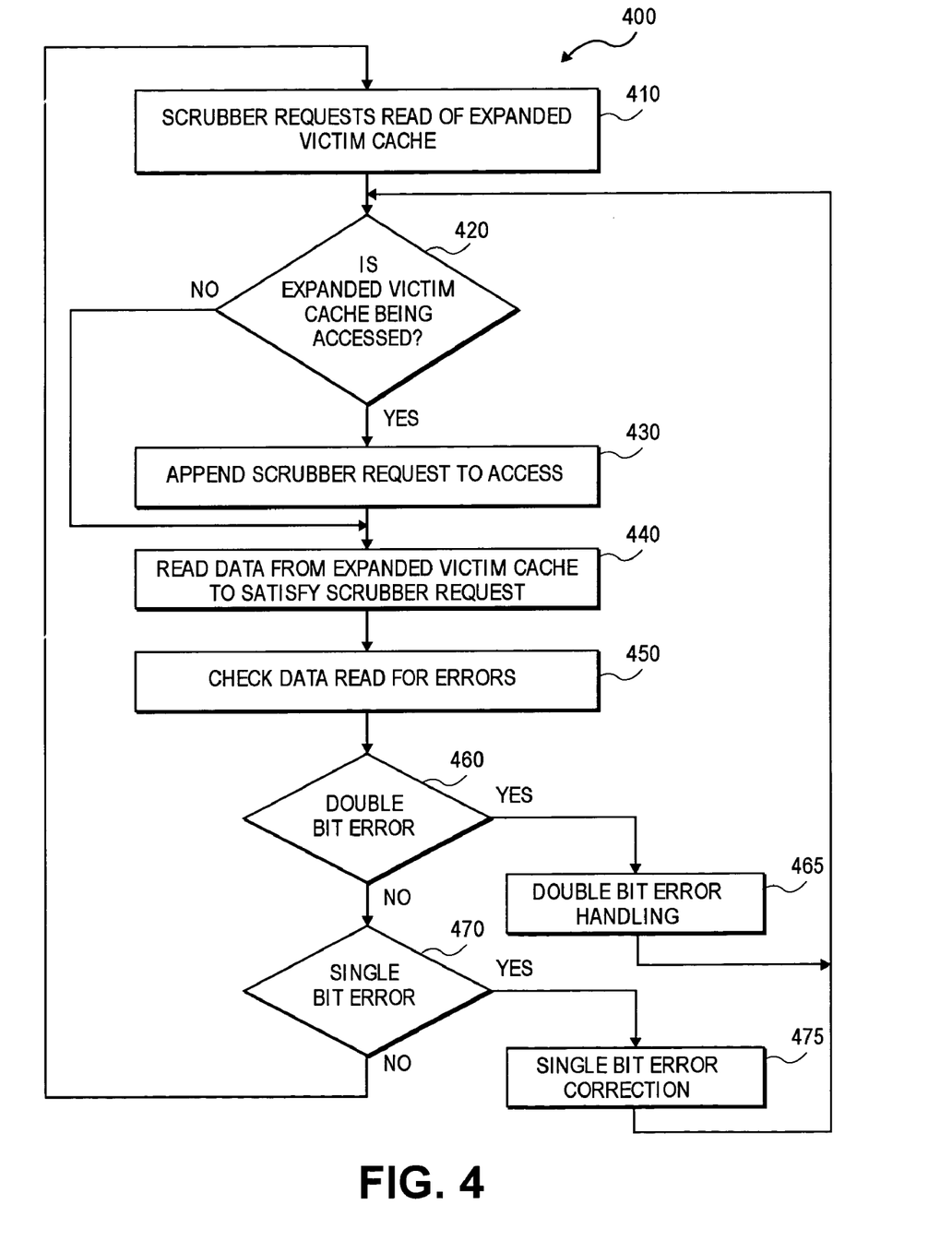
FIG. 4 is a flow diagram of a process for scrubbing memory of a memory device, in accordance with an embodiment of the invention.

FIG. 4 shows process 400, which may be a process for scrubbing errors from a removable expanded memory device, such as device 250. Moreover, process 400 may include using circuitry 356, controller 352, checker 376, and/or FIFO 358 to scrub single and/or double-bit errors from memory 390, correct errors in memory 390 (e.g., such as by writing corrected data words back to memory 390), logging such errors, and/or alerting software of such identification, correcting, logging, and/or scrubbing.

At block 410, a scrubber requests a read of data stored in an expanded victim cache memory. For example, block 410 may correspond to circuitry 356 requesting controller 352 to read data stored in memory 390. Block 410 may or may not include reading according to a scheduler or arbiter (e.g., such as a scheduler or an arbiter as described above for FIG. 3.

At decision block 420, it is determined whether the expanded victim cache is being accessed. Such access may be a currently occurring access (e.g., read and/or write), or a future access, such as a scheduled access or a requested access that has not yet occurred, to satisfy a received request from a host bus (e.g., such as request from interface 301). Block 420 may include a memory controller (e.g., controller 352) determining whether a removable expanded memory is being accessed. Block 420 may include determining whether the memory is being accessed by a DMA request, or by an application of a host or other device via interface 301.

If at block 420 it is determined that the expanded victim cache is being accessed, processing continues to block 430, where the read requested by the scrubber is appended to the other access or request to access the expanded victim cache. In some embodiments, it may be determined at block 420 that the expanded victim cache, although not currently being accessed, will be accessed according to a request from the host bus during reading of data stored from the expanded victim cache to satisfy the read requested by the scrubber. In this case, the process branches to block 430. Moreover, in some cases, it may be determined at block 420 that a request for access to the expanded victim cache has been received from the host bus, and although that request is not currently accessing the expanded victim cache. For instance, the victim cache may be found to be accessed if it is to be accessed other than by the scrubber (e.g., such as according to a request from the host bus), during satisfaction of the read requested by the scrubber. In these cases, processing may proceed to block 430 and the read requested by the scrubber may be appended to or concatenated onto the access request from the host bus.

Alternatively, in other embodiments, block 430 may be omitted, and if the expanded victim cache is being accessed, is going to be accessed, or if a request for access has been received from interface 301, processing will return to block 420 until that status no longer exists.

If the expanded victim cache is not being accessed processing may continue to block 440. At block 440, the data from the expanded victim cache is read to satisfy the read request of the scrubber. Block 440 may include reading data as described above with respect to satisfying a read request from circuitry 356 to read data stored in memory 390 (e.g., such as a read request sent to controller 352). Block 440 may include controller 352 requesting data be read from block 390 and deposited into FIFO 358, as described above.

Moreover, blocks 420, 430, and/or 440 may include scheduling, arbitrating, tracking, timing, and/or otherwise coordinating between the read request of the scrubber and a request to access the memory received from the host bus, as described above with respect to circuitry 356, controller 352, checker 376, device 250, a scheduler, a timer, a tracker, and/or an arbiter as described for FIG. 3.

After or during block 440, at block 450, the data read according to the read request by the scrubber is checked for errors. Block 450 may include checking the data read for errors as described above with respect to checker 376, single-bit error correction, and/or double-bit error correction as described for FIG. 3.

At block 460, it is determined if a double-bit error exists in the data read according to the read request from the scrubber. If at block 460 a double-bit error exists, processing continues to block 465 where double bit error correction occurs. Block 460 may include determining whether a double-bit error exists according to various circuitry and/or algorithms, as known in the art. It is also considered that block 460 may include determining if a multi-bit error for more than two bits exists in the data read.

At block 465, a double-bit error handling process is performed. Block 465 may include writing data to the expanded victim cache, or otherwise performing double-bit error handling, as known in the art. In some cases, detection of a multiple bit error at block 465 may cause (e.g., by "automatic invoking" a correction algorithm, such as described above for generator 372, checker 376) a correction algorithm or correction circuit to correct the multiple-bit error, handle the error otherwise, write a corrected data word to the expanded victim cache to replace the erroneous data word including the multiple-bit error, log the error, and/or alert software and/or an operating system of the multiple-bit error and correction thereof, as described herein. Multiple and double bit error correction algorithms may include Reed-Solomon algorithms, Golay algorithms, BCH algorithms, Chipkill algorithms, Hamming code with parity (or Hamming distance) algorithms, and various other appropriate multiple-bit error correction algorithms. Block 465 may also include alerting software and/or an operating system of a double-bit error, sending the operating system an interrupt, and/or otherwise dealing with a double-bit error, as described above with respect to checker 376, and/or double-bit error handling as described for FIG. 3. After block 465 processing returns to block 420. Alternatively, after block 465 processing may return to block 410.

If at block 460 a double-bit error is not identified, processing continues to block 470 where it is determined if a single-bit error exists in the data read according to the read request from the scrubber. If at block 470 a single-bit error exists, processing continues to block 475.

At block 475, single-bit error correction process is performed. Block 475 may include correcting a single-bit error as described above with respect to checker 376, device 250, and/or single-bit error correction as described for FIG. 3. In some cases, detection of a single bit error at block 470 may cause (e.g., by "automatic invoking" a correction algorithm, such as described above for generator 372, checker 376) a correction algorithm or correction circuit to correct the single-bit error, write a corrected data word to the expanded victim cache to replace the erroneous data word including the single-bit error, log the error, and/or alert software and/or an operating system of the single-bit error and correction thereof, as described herein. Single bit error correction algorithms considered include those such as Reed-Solomon algorithms, Golay algorithms, BCH algorithms, Chipkill algorithms, Hamming code with parity (or Hamming distance) algorithms, "parity" correction algorithms, and various other appropriate single bit error correction algorithms. After block 475, processing returns to block 420, or optionally returns to block 410.

If at block 470 a single-bit error is not identified, processing continues to block 410. In other words, at block 470, if a single-bit error is not identified, an error may not exist in the read of data stored in the expanded victim cache. Thus, the data stored in the expanded victim cache read according to the read request of the scrubber may be accurate or correct data. Alternatively, it is contemplated that after block 470, if a single-bit error is not detected, processing may return to block 420.

In some embodiments, the functionality of a scheduler, block 410 and/or block 440 may include requesting a read of data stored or reading data from an expanded victim cache after a programmable delay, at a programmable frequency, or periodically. Similarly, the functionality of a scheduler, block 410 and/or block 440 may include reading all of the data currently stored in memory 390 or in an expanded victim cache once before any of the data stored in the memory or expanded victim cache is reread. Likewise, the functionality of a scheduler, block 410, and/or block 440 may include reading a data word, or portion of memory 390 and/or an expanded victim cache in which a single bit and/or double-bit error is identified for, prior to reading any different data word or portion of the memory, or rereading any other data word or a portion of the memory.

In some cases, block 410 may include an operating system (e.g., software of device 250, software external to device 250, the operating system stored in memory 220 as shown in FIG. 2, an operating system of the host coupled to host bus 301 as shown in FIG. 3, and/or the operating system of a storage server turning the scrubber (e.g., circuitry 356) off/on, and/or programming a period at which scrubbing will occur (e.g., a period at which circuitry 356 will request reads of data).

However the actual scrubbing operation (reading and correcting data, such as blocks 420-460 and 470) may be controlled entirely by hardware (e.g., circuitry 356, controller 352, checker 376, device 250, a scheduler, a timer, a tracker, and/or an arbiter as described for FIG. 3) with or without any software intervention. It is considered that a default state of the scrubber could be to start reading memory locations at a default interval (e.g., block 410) and to always attempt to correct errors and write back corrected data into memory over the erroneous data (e.g., blocks 465 and 475). The scrubber could also interrupt the operating system if an uncorrectable error were encountered (e.g., blocks 465 and 475).

Next, in some cases, the functionality of an arbiter of device 250, circuitry 356, controllers 352, a scheduler; and/or block 420 may prohibit access to memory 390 or the expanded victim cache by the scrubber or scrubbing circuitry 356 when the memory or cache is being accessed, to be accessed or a request for access has been received from the host bus, and vice versa. In other words, reading of the memory or expanded victim cache to satisfy a request from circuitry 356 may only occur when access to the memory is idle from requests for access received from the host bus, and vice versa. According to some embodiments, a computing device may check data from memory (e.g., removable expanded memory device 250) for errors during normal read operations, and may also "scrub" portions of the memory for errors by reading the portions, such as on a periodic basis and/or when those portions are not being written to or read from (e.g., see block 410 of FIG. 4). If an error is detected, the computing device can correct the error internally and write the corrected data back out to the memory device to prevent that soft bit error from causing further problems (e.g., see blocks 450-475 of FIG. 4). If the detected error is a hard error, that error will continue to show up with an error every time that portion of data is read, such as until the portion of memory is physically replaced.

For instance, a scrubbing element (e.g., memory scrubbing circuitry 356) in the hardware (e.g., hardware including memory scrubbing circuitry 356) may read the memory on a periodic basis simply to look for failures (e.g., see block 410 of FIG. 4). This could be done with one of two processes. First, the hardware could fill in every moment of idle memory time with a read request (e.g., process 400 of FIG. 4 without block 410 and where a "yes" result at block 420 causes process 400 to return to block 420). This process may cause too many memory checks during idle times or too few checks during busy periods.

So instead, another process may use a programmable timer that would force the hardware to check the next sequential set of data on a periodic basis (e.g., see process 400 of FIG. 4). For example, the hardware might want to read a new 32-byte chunk of data every 3 milliseconds (e.g., see block 410 of FIG. 4). This periodic reading may have a goal of scrubbing of about 1 GB of memory per day. Having a firm period can make the scrubbing operation more predictable and consistent but may interfere with normal memory operation more often than an algorithm optimized for idle memory time.

Once the scrubber has chosen the time to read the data, the scrubber may issue the request to memory and wait for the data to arrive (e.g., see block 420-440 of FIG. 4). As the data arrives, it may go though a set of pipelined stages at which each word of memory (usually 72 bits) is checked according the chosen ECC algorithm (e.g., see blocks 450, 460, and 470 of FIG. 4). If no errors are present, the data may no longer be needed by anything and may simply be discarded (e.g., a "no" answer at block 470 of FIG. 4). However, if an error shows up during any of these reads, the scrubber can correct the error in a downstream stage that applies the ECC correction algorithm on the data (e.g., see blocks 465 and 475 of FIG. 4). In the final stage of the pipeline, the scrubber may write corrected data back to the memory (e.g., see blocks 465 and 475 of FIG. 4). If the data was uncorrectable, this condition could be flagged in a status register before the scrubber sends an interrupt to the host processor (e.g., see blocks 465 and 475 of FIG. 4).

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. An apparatus comprising:
a main cache memory coupled to a host bus;
a removable expanded memory device having a victim cache memory associated with the main cache memory and coupled to the host bus by a host bus interface, wherein the removable expanded memory device comprises:
a plurality of dual in-line memory modules (DIMMs);
a tracker coupled to the DIMMs to identify a memory access request to an address in the DIMMs that is within a particular memory bank to be checked for errors;
memory scrubbing circuitry coupled to the memory to request a plurality of reads of data stored at a plurality of addresses of the DIMMs, and to identify single-bit errors and double-bit errors in the reads of data, wherein at least one read request of the plurality of reads is to read data stored at an address in the particular memory bank and is appended to the memory access request identified by the tracker;
a memory controller coupled between the DIMMs and the memory scrubbing circuitry; and
a direct memory access (DMA) logic circuit coupled between the memory controller and the host bus interface.

2. A method comprising:
tracking memory access requests to a removable expanded memory device to identify a memory access request to an address in the memory that is within a particular memory bank to be checked for errors, the removable expanded memory device coupled to a host bus to allow a host to access the memory;
reading data stored at addresses of the memory, wherein at least one read request is to read data stored at an address in the particular memory bank and is appended to the memory access request identified by the tracking;
identifying single-bit errors and double-bit errors in the data read according to error control coding (ECC) checks performed on the data read using error control codes corresponding to the data read.

3. The method of claim 2, wherein identifying comprises using single-bit error control coding (ECC) correction codes.

4. The method of claim 2, further comprising:
automatically invoking a correction algorithm to correct a single-bit errors identified during identifying;
writing a corrected data word back to the memory device to replace an erroneous data word including the single-bit error; and
alerting software of the identifying and writing.

5. The method of claim 2, further comprising:
alerting software if a double-bit error is identified during identifying.

6. The method of claim 2, further comprising:
reading and identifying groups of sequentially increasing addresses of the memory device periodically.

7. The method of claim 2, wherein all the data stored in the memory device is read once before any of the read data is reread.

8. The method of claim 2, wherein a portion of the memory device identified as having a single-bit error or a double-bit error is reread before all of the data stored is read.

9. The method of claim 2, wherein reading comprises reading a memory bank of memory device after accessing the bank to satisfy a DMA request from a host bus.

10. The method of claim 2, further comprising accessing the memory device over a host bus to satisfy a plurality accesses to the memory device by a plurality of applications.

11. The method of claim 10, wherein reading occurs when access to the memory device by the applications is idle.

* * * * *